United States Patent [19]
Dusek

[11] Patent Number: 5,171,039
[45] Date of Patent: Dec. 15, 1992

[54] MEDICAL INFORMATION CARD

[75] Inventor: Michael E. Dusek, Newark, Del.

[73] Assignee: Micro Innovations, Incorporated, Newark, Del.

[21] Appl. No.: 572,265

[22] Filed: Aug. 27, 1990

[51] Int. Cl.⁵ .................................................. B42D 15/00
[52] U.S. Cl. ..................................... 283/75; 283/900; 281/2
[58] Field of Search ............... 281/2, 51; 283/67, 900, 283/71, 75

[56] References Cited

U.S. PATENT DOCUMENTS

| | | |
|---|---|---|
| Re. 31,847 | 3/1985 | Luckey . |
| 3,810,566 | 5/1974 | Adams . |
| 3,921,318 | 11/1975 | Calavetta . |
| 4,236,332 | 12/1980 | Domo . |
| 4,252,427 | 2/1981 | Brecht . |
| 4,259,391 | 3/1981 | Brecht . |
| 4,318,554 | 3/1982 | Anderson . |
| 4,467,335 | 8/1984 | Schmidt et al. ...................... 346/160 |
| 4,575,127 | 3/1986 | Michel . |
| 4,619,469 | 10/1986 | Grover . |
| 4,632,428 | 12/1986 | Brown . |
| 4,648,189 | 3/1987 | Michel . |
| 4,692,394 | 9/1987 | Drexler . |

Primary Examiner—Timothy V. Eley
Assistant Examiner—William Fridie
Attorney, Agent, or Firm—Connolly & Hutz

[57] ABSTRACT

A wallet size laminated medical information card is made by providing the information on a form at a physician's center. The information is then transmitted to a data base where it is reproduced on format software which adjusts the size of the information for wallet size. The information is then laser printed onto a card which is plastic laminated and folded so that it is of conventional credit card size, while the information thereon can be read without the use of special optical devices.

6 Claims, 5 Drawing Sheets

| MEDICAL CENTER OF DELAWARE<br>CHRISTIANA HOSPITAL<br>4755 STANTON-OGLETOWN ROAD<br>NEWARK, DELAWARE, 19718<br>PHONE: (302) 733-1000 ||||
|---|---|---|---|
| PATIENT INFORMATION ||||
| NAME: || AGE: | BLOOD TYPE: |
| ADDRESS: ||||
| CITY: | STATE: || ZIPCODE: |
| TELEPHONE | HOME: || WORK: |
| CARDIOLOGIST NAME: ||| PHONE: |
| LOCATION: ||||
| FAMILY PHYSICIAN: ||| PHONE: |
| LOCATION: ||||
| INSURANCE CARRIER: ||| POLICY NUMBER: |
| POLICY HOLDER: ||||

| MEDICATIONS: | MEDICATION | DOSAGE |
|---|---|---|
| | 1.<br>2.<br>3.<br>4. | |

SPECIAL CONDITIONS:

MEDICAL ILLNESSES (DM, HBP, TOBACCO, HIGH CHOLESTEROL, ETC...):

OTHER SURGERIES (GALL BLADDER, ETC...):

VALVES EFFECTED:

| NUMBER OF VESSELS: | VESSELS EFFECTED: | |
|---|---|---|
| | CABG: | DATE: |
| CATH DATE: | PTCA: | |

COMMENTS:

| MYOCARDIAL INFARCTIONS: | DATE: |
|---|---|

ALLERGIES

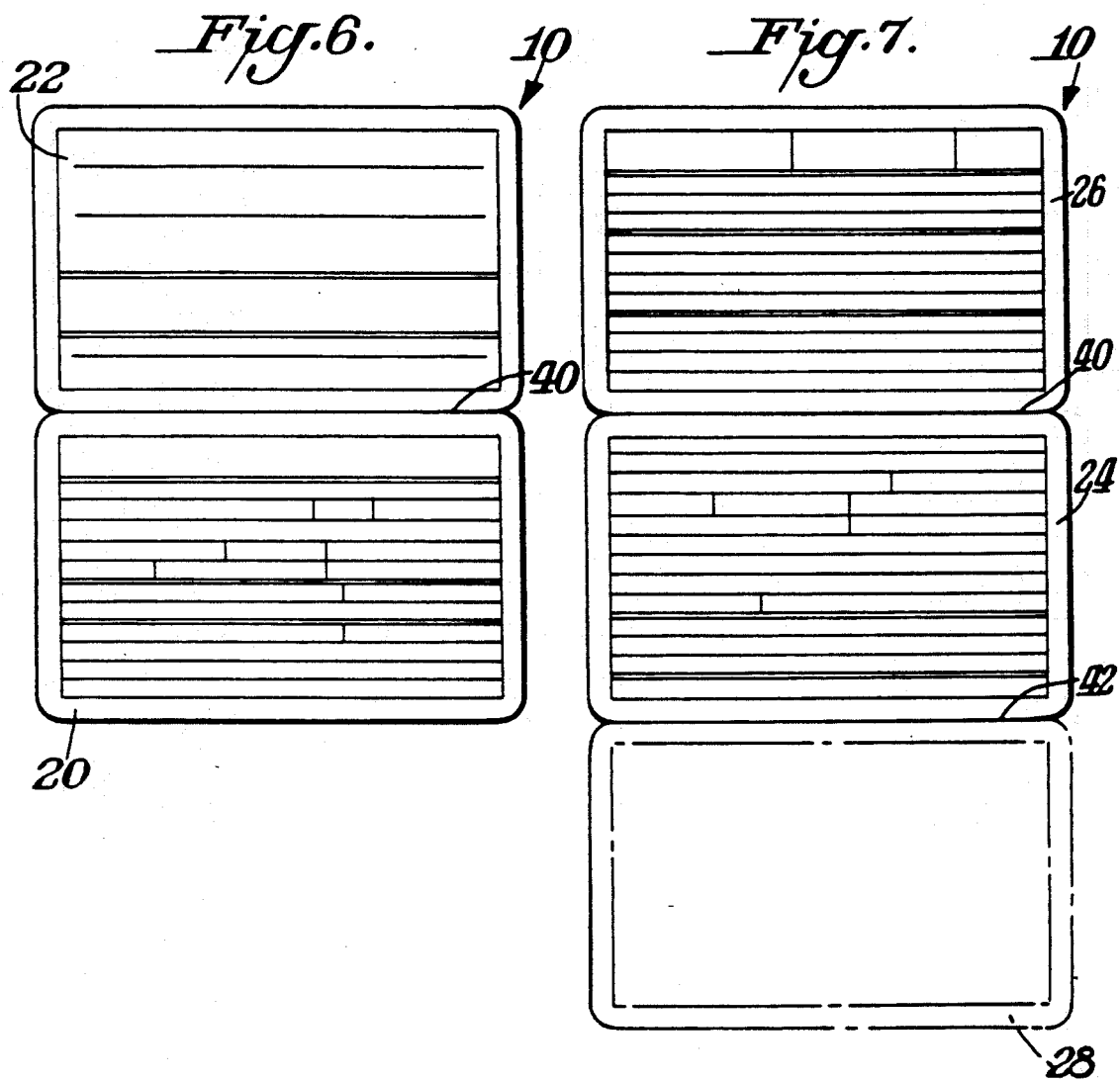
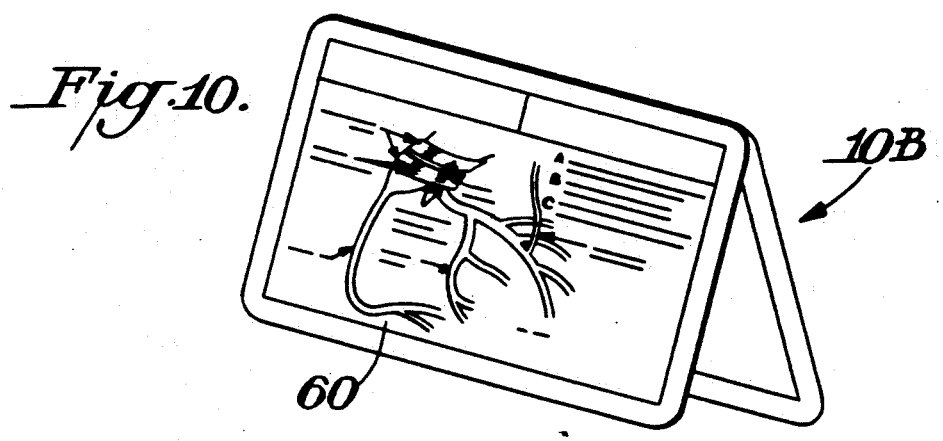

MEDICAL INFORMATION CARD

BACKGROUND OF INVENTION

It would be very desirable if individuals carried with them pertinent medical information which would be useful in times of medical emergency when medical treatment is necessary and time is of the essence. Various attempts have been made at providing medical information cards. Generally, however, these prior attempts have been impractical in that they require special reading equipment or include microfilms or microchips.

It would be desirable if a medical information card could be provided which could be of a credit card size to be easily carried in the wallet or purse of the user. Additionally, it would be desirable if such card could contain all of the information necessary for treatment of the user under emergency medical conditions. Further, it would be desirable if such a card could be made in a convenient low cost manner without detracting from its ability to contain the necessary information and without detracting from its ability to have the information read with the naked eye and not require special reading equipment.

SUMMARY OF INVENTION

An object of this invention is to provide a medical information card fulfilling the above needs.

A further object of this invention is to provide such a medical information card which could be produced using computer software to assure accurate reproduction of the information at high speed.

In accordance with this invention, the medical information card is made by obtaining the necessary information from the patient and/or physician at the physician's center such as at the hospital or physician's office. The information is then transmitted to a data base center where it is retyped onto format computer software which adjusts the size to credit card size. The information is then printed using for example, laser printing onto the card. The information is then checked and the card is trimmed and laminated so that it can be protected when carried by the user.

In a preferred practice of the invention the card is folded at least once so that its credit card size can be maintained while increasing the surface area for maximizing the amount of information on the credit card. The information may include not only details in word form but also EKG curves or other graphic information pertinent to the patient.

THE DRAWINGS

FIGS. 2–5 are forms used for collecting the information 12, 14, 16 and 18 usable on the medical information cards in accordance with this invention;

Figure 9:
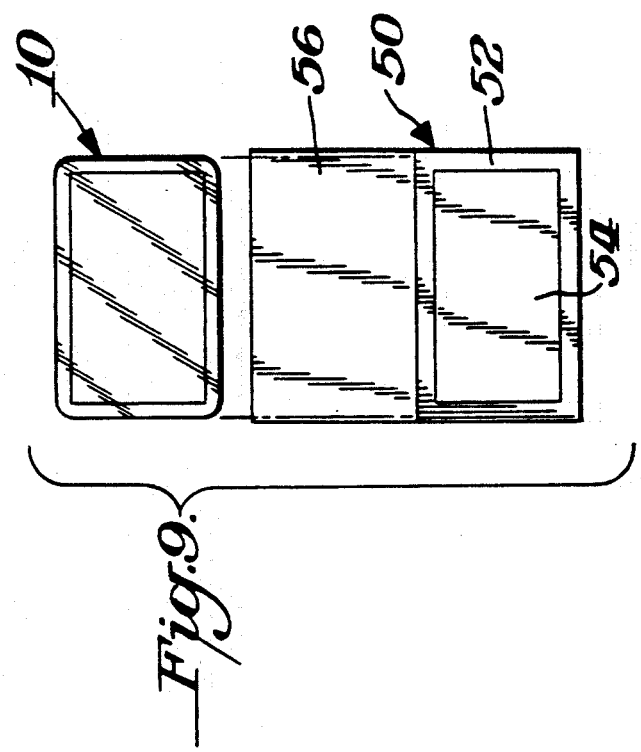
Figure 8:
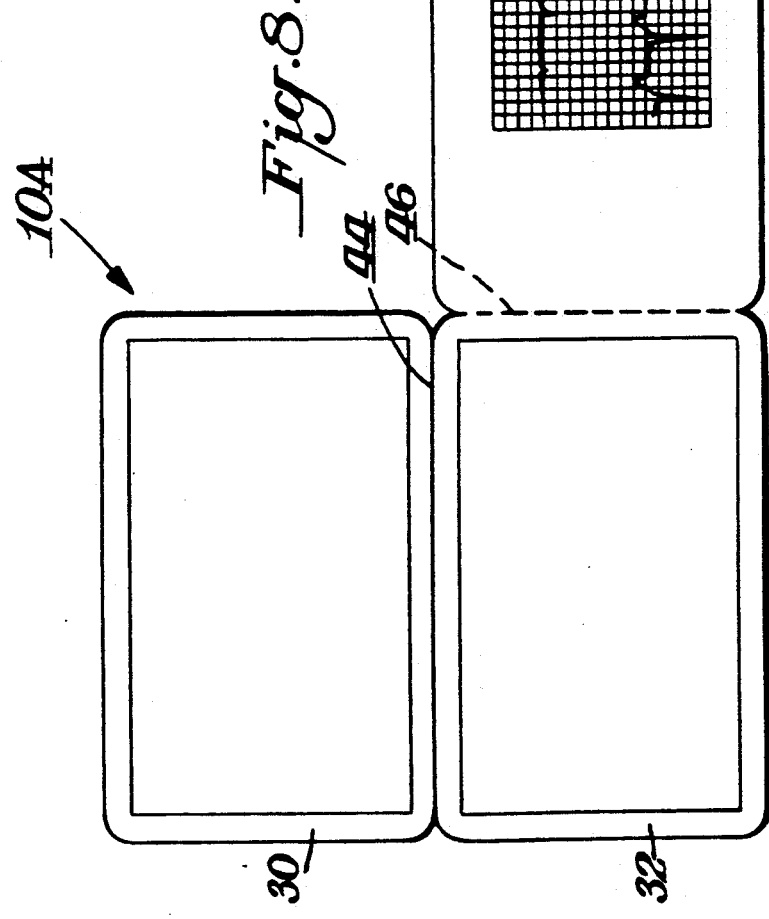

FIG. 6 i s a medical information card containing the information from the forms of FIGS. 2–3 in accordance with this invention;

FIG. 7 is a medical information card containing the information of FIGS. 4–5 in accordance with this invention;

FIG. 8 is a medical information card for cardiac patients in accordance with this invention;

FIG. 9 is an exploded view showing the insertion of a medical information card in a protective jacket in accordance with this invention; and FIG. 10 is a perspective view of a folded medical information card in accordance with a further embodiment of this invention.

DETAILED DESCRIPTION

Figure 1:
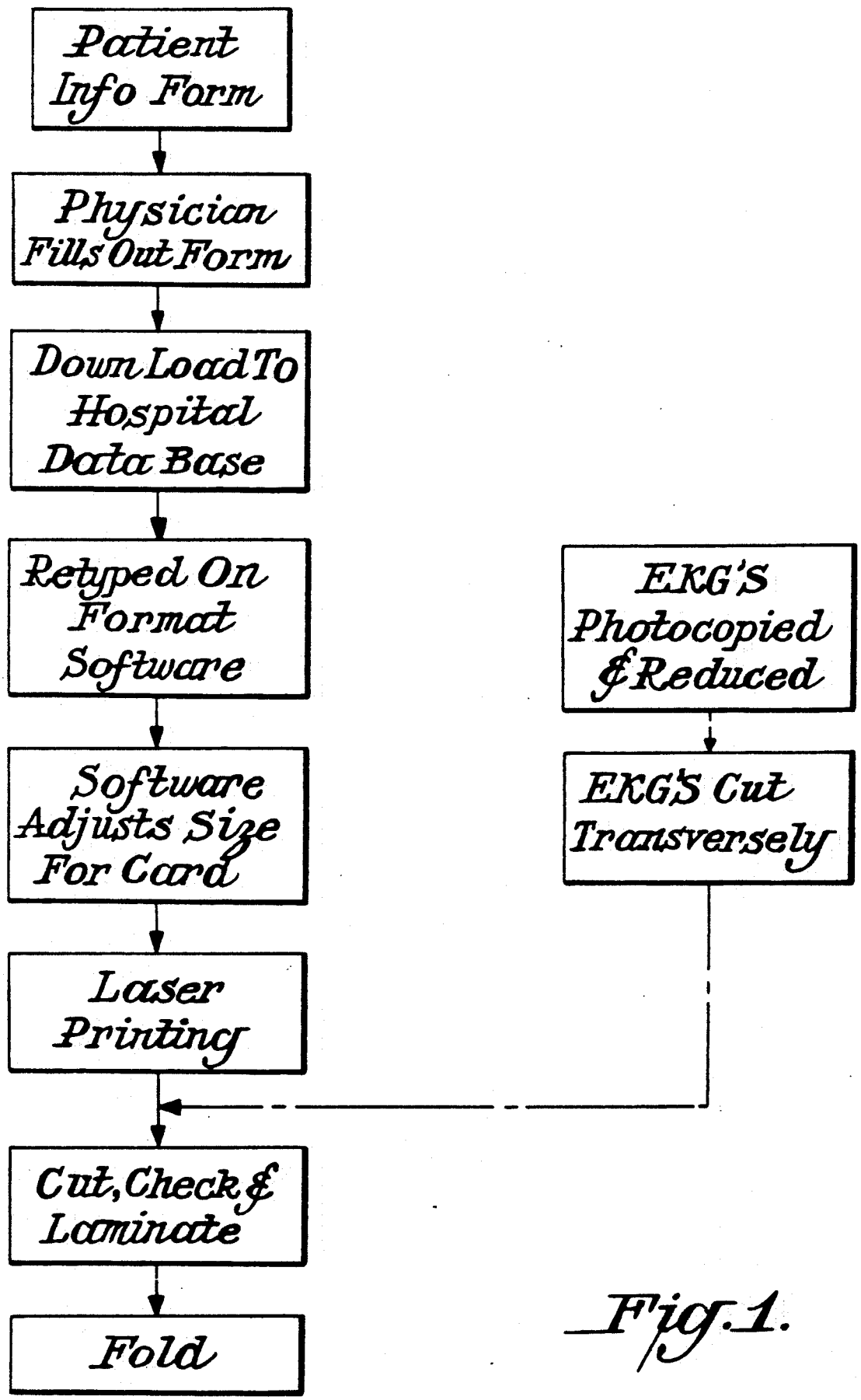
FIG. 1 is a flow diagram indicating the steps used for making a medical formation card 10 in accordance with this invention.

The present invention involves the making of medical information cards of credit card size which can be conveniently carried by the user in the wallet or purse. The invention generally involves obtaining the proper medical information which is entered into a patient information form at a physician location such as a hospital or a physician's office. That information is then transmitted to a remote data base center where the information is retyped onto software which reduces the information to credit card size. The information is then laser printed onto a credit card and after checking the information for accuracy the card is cut to the intended size and a protective lamination envelopes the card. FIG. 1, for example, illustrates a flow diagram indicating the basic steps for making a medical information card in accordance with this invention.

FIGS. 2–5 illustrate patient information forms usable with this invention. For example, FIGS. 2–3 might contain the information which would ultimately be on one side of the medical information card after the card is folded. Accordingly, FIG. 2, for example, illustrates a form 12 which would contain the basic information regarding identification of the patient and other pertinent patient data. FIG. 3 illustrates a form 14 which would be upside down when juxtaposed to form 12 so that when the information is transcribed to the card 10 the information would be transcribed in such a manner that the card can be folded and read without having to rotate the card. Form 14 might, for example, contain legal information such as a consent form which would be signed by the user and appropriately witnessed. Accordingly, when the card 10 is folded the corresponding information from forms 12 and 14 would appear on the outer faces of the card.

FIGS. 4–5 are forms 16, 18 which would indicate the specific medical details pertinent to that patient as indicated in the forms themselves. This information would appear on the inner faces of the folded card 10.

In practice the suitable patient information forms, such as 12, 14, 16 and 18 would be given to a patient and/or physician or nurse so that the appropriate information could be filled in in all of these forms. A particularly advantageous type of medical card would be a card created for a newborn child. Such a card would not only include specific medical information regarding the child, but might also, for example, include fingerprints of the child for identification purposes.

The patient information forms 12, 14, 16, 18 would be of normal size such as 8½×11 paper so that the blanks could be readily completed. Once the information forms are completed it is necessary to transmit the information to a remote data base center. This might be done, for example, by use of a modem at the physician area which would communicate directly with the computer equipment in the data base center so as to download the information to the data base. Alternatively, the forms 12, 14, 16, 18 themselves, or copies thereof, could be mailed directly to the data base center or transmitted in any other suitable manner. When the information is received at the data base center, it is retyped onto the format software which appropriately adjusts the size to credit card size. Thus, for example, the information on an 8½×11 patient information form would be reduced to being in an area no greater than 2⅛ inches by 3⅝ inches. The software at the data base center provides for an automatic size adjustment to the correct size.

The next step in the making of the medical information cards would be to print the information to the cards themselves. This is preferably done by laser printing which is extremely accurate and legible whereby even with a size reduction, the information is readily readable with the naked eye and without the need for any special reading equipment. After the information has been printed onto the card, the information is checked to be sure it has been accurately printed The card is then cut to the appropriate size, such as, for example, credit card size which would be about 2-2¼ inches by 3¼-3½ inches and preferably 2⅛ by 3⅝ inches. Alternatively, as later described, the card could be of military size, which is about 2⅜ inches by 4¼ inches.

The next step in the method of making the medical information card 10 is to laminate the card to provide a protective plastic covering completely enveloping the card. Preferably this is done by a hot roll lamination step as is known in the art.

FIG. 6 illustrates one side, such as the outer faces, of a card 10 formed in accordance with this invention. As shown therein the information from form 12 would be reprinted at reduced size to one portion 20 on one side of card 10. The information from form 14 would be reprinted to reduced size on the other half or portion of the same side of card 10 as portion 20. The connecting edge 40 may be perforated to facilitate folding. FIG. 7 illustrates the opposite side of card 10 wherein the information from form 16 would appear on portion 24 and the information from form 18 would appear on portion 26 of the same side of card 10. FIG. 7 also illustrates a further variation of this invention wherein the card 10 could include more than two sections. For example, as illustrated in phantom a third section 28 is attached to section 24 so that one or both sides of the third section 28 could contain additional information. A fold line 40 separates sections 24 and 26 as shown in FIG. 7. Similarly, the same fold line of course separates sections 20 and 22 which are on the reverse side of sections 24 and 26. A further fold line 42 separates sections 28 and 24. Each of the sections is of credit card size. Accordingly, when the sections are folded at the fold lines such as folding section 28 upon section 42 at fold line 22 and then folding section 26 upon section 24 at fold line 40 the resultant card is of credit card size which corresponds to the size of a single section.

FIG. 8 illustrates a further variation of this invention wherein the credit card 10A is particularly designed for cardiac patients. As shown therein the card 10A would include sections 30 and 32, each of which is of credit card size with the individual sections being joined together at fold line 44. Sections 30, 32 would contain the information from the appropriate patient information forms as previously described. In the embodiment of FIG. 8, however, EKG curves 34 are provided on extensions 36, 38 which are joined together by fold line 48 while sections 32 and 36 are joined together by fold line 46. The opposite side of sections 36, 38 would contain additional EKG curves. In practice a series of such curves would be formed on an appropriate carrier sheet and as illustrated in the step diagram of FIG. 1, the EKG curves would be photocopied and reduced in the same operation. The curves would then be separated from each other by a transverse cut so that half of the curves would be placed on one side of sections 36, 38 while the other half of the curves would be on the opposite side of those sections. When viewing the resultant card before folding in FIG. 8, the entire card may be considered as being of L-shape with section 32 functioning as a base section. Section 30 might be considered a first wing section extending from one side of section 32 while sections 36, 38 might be considered as second and third wing sections extending from the adjacent side of base section 32. After the card is formed, it is folded to credit card size, by for example, folding section 34 upon section 36 at fold line 48 and then folding the two wing sections upon base section 32 at fold line 46. Section 30 would then be folded over the two folded wing sections at fold line 44 so as to thereby form a folded card 10A of credit card size.

Where there are relatively few EKG curves, such as for example the four curves of FIG. 8, the curves may be conveniently used for credit card size cards. In instances, however, where a much larger number of curves, such as 12 curves, are required, the curves would be separated into two sets of six curves and the individual sections would be of a larger size such as military size.

FIG. 9 illustrates a further advantageous feature of this invention. As shown therein, the card 10 is protected in a plastic envelope 50 which includes a pocket section 52 having a transparent window 54 with a flap or cover 56 being secured to pocket 52. Card 10 may be inserted into the pocket section 52 and would be visible through window 54. While in its stored condition in for example a wallet or pocketbook, however, flap 56 would be folded downwardly to cover window 54.

As previously indicated, the card 10 is protected by being enveloped in a plastic laminate. Advantageously conventional laminating techniques such as hot roll laminating may be used. For example, the card may be placed on an over-sized plastic sheet which is folded over the card and then the folded plastic sheet is secured together by hot roll lamination. Afterwards the laminated composite is trimmed to proper size. Card 10 may be of any suitable dimension such as the conventional credit card size or military card size. Card 10 has a thickness of from 2 to 5 mils.

Any known techniques may be used for the lamination of the cards and for the forming of the pouches or envelopes 50. For example, pouches 50 could be custom vinyl pouches. Similarly, custom tooling and dies could be used to manufacture custom heat sealed laminate plastic.

FIG. 10 illustrates a variation of this invention wherein a card 10B is formed. In this embodiment, however, the card 10B would contain information produced by computer graphics to for example create an operative record. Thus card 10B might include details 60 concerning an operation including graphically illustrating the operative site with verbal comments. The remaining faces of card 10B could contain other personal and medical information for that patient.

As can be appreciated, the invention thus provides a medical information card which is capable of being produced at high speed and low cost while still containing all the information necessary for a patient under emergency medical conditions with the information being readily readable with the naked eye. The techniques used for producing the medical card are such that a sturdy card results. Moreover, as any change occurs pertinent to the patient such as a change in the medical condition or even a change in personal information, the information could be quickly and easily incorporated in a revised card.

It is to be understood that the specifically described information to be included on the cards is illustrative for the preferred embodiments. Other types and combinations of information may be included. For example, the same card could include an operative record and/or medical information and/or EKG. The cards could be adapted for all fields of medicine.

The invention in its broad form could be practiced where the card has only one section which includes information on both sides. Preferably, however in order to maximize the amount of information that would be included, the card has a plurality of sections each of which is about for example, is of credit card size. By having the sections connected to each other before lamination a stronger card is formed at the fold line since the card itself is also at the fold line, rather than merely having layers of the plastic lamination at the fold line. Advantageously the invention may be practiced by utilizing conventional computer equipment to form the information on the substrate or card. Similarly, known printing equipment may be used such as a Hewlett-Packard GP laser printer which accurately prints the information with a clarity sufficient to enable the information to be readily read with the naked eye despite the information being of reduced size.

What is claimed is:

1. A medical information card comprising a substrate having a base section, a first wing section integral with an extending from one edge of said base section, said one edge being a first fold line, a second wing section integral with and extending from a second edge of said base section, said second edge being a second fold line, a third wing section integral with and extending from an edge of said second wing section remote from said second fold line, said remote edge being a third fold line, all of said sections being of generally the same size and shape, each of said sections having a front face and a back face, printed personal and medical information being on said front and back faces of said base section and said first wing section, EKG information in the form of EKG curves being on said front and back faces of said second and third wing sections, said information being of a size to be readable with the naked eye and without requiring special optical equipment, a plastic sheet laminated to and enveloping said substrate, said second and said third wing sections being folded on each other at said third fold line and being folded on said base section at said second fold line, and said first wing section being folded on said base section at said first fold line to form a folded composite of the same size and shape as said base section.

2. The card of claim 1 wherein said substrate is L-shaped and said first and second fold lines being adjacent sides of said base section.

3. The card of claim 1 wherein each of said fold lines is perforated.

4. The card of claim 1 wherein said size is credit card size.

5. The card of claim 1, wherein said size is military card size and there being more than four EKG curves.

6. The card of claim 1, in combination therewith, an envelope, said envelope having a pocket section of the same shape as and slightly larger than said folded composite, said folded composite being inserted into said envelope, one face of said envelope having a transparent window to permit said composite to be visible therethrough, and said envelope having a flap for selectively covering said window.

* * * * *